(12) United States Patent
Cardenas-Valencia et al.

(10) Patent No.: US 8,920,986 B2
(45) Date of Patent: Dec. 30, 2014

(54) METHOD AND SYSTEM FOR PROVIDING A FLOW THROUGH BATTERY CELL AND USES THEREOF

(75) Inventors: Andres M. Cardenas-Valencia, Tampa, FL (US); Lori Adornato, Seminole, FL (US); Robert T. Short, St. Petersburg, FL (US); Larry C. Langebrake, Seminole, FL (US); Steven Crouch-Baker, Palo Alto, CA (US)

(73) Assignee: SRI International, Menlo Park, CA (US)

(*) Notice: Subject to any disclaimer, the term of this patent is extended or adjusted under 35 U.S.C. 154(b) by 1186 days.

(21) Appl. No.: 12/681,057

(22) PCT Filed: Oct. 3, 2008

(86) PCT No.: PCT/US2008/078828
§ 371 (c)(1),
(2), (4) Date: Mar. 31, 2010

(87) PCT Pub. No.: WO2009/046358
PCT Pub. Date: Apr. 9, 2009

(65) Prior Publication Data
US 2010/0216038 A1 Aug. 26, 2010

Related U.S. Application Data

(60) Provisional application No. 60/997,824, filed on Oct. 5, 2007.

(51) Int. Cl.
*H01M 8/06* (2006.01)
*H01M 6/34* (2006.01)
*H01M 6/32* (2006.01)
*H01M 6/24* (2006.01)
*H01M 16/00* (2006.01)

(52) U.S. Cl.
CPC *H01M 6/34* (2013.01); *H01M 6/32* (2013.01); *H01M 6/24* (2013.01); *H01M 16/003* (2013.01)
USPC ............... 429/409; 429/63; 429/51; 429/118

(58) Field of Classification Search
CPC ............ H01M 6/32; H01M 6/64; H01M 6/24
USPC ........... 429/51, 63, 118, 119, 409, 50, 74, 80, 429/84
See application file for complete search history.

(56) References Cited

U.S. PATENT DOCUMENTS

| | | | |
|---|---|---|---|
| 6,228,527 B1 * | 5/2001 | Medeiros et al. | 429/119 |
| 7,255,960 B1 * | 8/2007 | Dow et al. | 429/105 |
| 2006/0228622 A1 * | 10/2006 | Cohen et al. | 429/101 |

* cited by examiner

*Primary Examiner* — Milton I Cano
*Assistant Examiner* — Jimmy K Vo

(57) ABSTRACT

In one embodiment, the present invention relates generally to a system for providing a flow through battery cell and uses thereof. In one embodiment, the flow through battery cell includes an inlet for receiving a flow of water, a solid oxidizer coupled to the inlet for reacting with the flow of water to generate a catholyte, wherein the solid oxidizer comprises at least one of: an organic halamine, a succinimide or a hypochlorite salt, a galvanic module coupled to the solid oxidizer for receiving the catholyte and generating one or more effluents and an outlet for releasing the one or more effluents.

10 Claims, 6 Drawing Sheets

METHOD AND SYSTEM FOR PROVIDING A FLOW THROUGH BATTERY CELL AND USES THEREOF

RELATED APPLICATIONS

This is a 371 national phase application of PCT/US2008/78828 filed Oct. 3, 2008, claiming priority under 35 USC 119(e) to U.S. provisional patent application Ser. No. 60/997,824, filed on Oct. 5, 2007, the contents of which are incorporated herein by reference.

FIELD OF THE INVENTION

The present invention relates generally to a method and system for providing a flow-through battery cell and uses thereof.

BACKGROUND OF THE INVENTION

Battery systems with increased power and energy density are needed for many applications. Marine technology that utilizes batteries includes vehicles and sensor technology. In many cases, the weight of the battery systems is so significant that their weight becomes the limiting factor in further reduction of size and weight in the deployable sensors. Moreover, current battery technology are inherently difficult to package and use for underwater applications. In addition, depending on the depths current battery technology will be used in underwater applications, the batteries may require heavy pressure housings, which also add to the weight and costs of current battery technology.

SUMMARY OF THE INVENTION

In one embodiment, the present invention is directed towards a method and system for providing a flow through battery cell and uses thereof. In one embodiment, the flow through battery cell includes an inlet for receiving a flow of water, a solid oxidizer coupled to said inlet for reacting with said flow of water to generate a catholyte, wherein said solid oxidizer comprises at least one of: an organic halamine, a succinimide or a hypochlorite salt, a galvanic module coupled to said solid oxidizer for receiving said catholyte and generating one or more effluents and an outlet for releasing said one or more effluents.

In one embodiment, the present invention is directed towards a second embodiment of a flow through battery cell. The flow through battery cell comprises an inlet for receiving a flow of water, a solid oxidizer coupled to said inlet for reacting with said flow of water to generate a catholyte, wherein said solid oxidizer comprises at least one of: solid peroxide particles, solid superoxide particles or solid carbonate particles wherein a weight ratio of said at least one of: solid peroxide particles, solid superoxide particles or solid carbonate particles to water is controlled such that a temperature increment providing a controlled decomposition of said at least one of: solid peroxide particles, solid superoxide particles or solid carbonate particles is achieved to produce said catholyte, a galvanic module coupled to said solid oxidizer for receiving said catholyte and generating one or more effluents and an outlet for releasing said one or more effluents.

In one embodiment, the present invention is directed towards a system. The system comprises a basic galvanic battery cell for receiving a first flow of water and generating a basic effluent, an acidic galvanic battery cell for receiving a second flow of water and generating an acidic effluent and an effluent conditioning cell coupled to said basic galvanic battery cell and said acidic galvanic battery cell for combining said basic effluent and said acidic effluent to create a neutral effluent.

In one embodiment, the present invention is directed towards a second type of system. The system comprises a flow through battery cell, wherein said flow through battery cell generates at least one effluent and a module coupled to said flow through battery cell, wherein said at least one effluent is used by said module to create energy In one embodiment, the present invention is directed towards a method for feeding a fuel cell. The method comprises flowing water through a solid oxidizer to create a liquid cathode, contacting said liquid cathode to a metal anode, oxidizing said metal anode to release an oxidized metal, one or more electrons and one or more effluents and providing said one or more effluents to said fuel cell.

In one embodiment, the present invention is directed towards a third system. The system comprises a flow through battery cell, wherein said flow through battery cell generates at least one effluent and a module coupled to said flow through battery cell, wherein said at least one effluent is used by said module to condition said module.

In one embodiment, the present invention is directed towards a method of conditioning a cell. The method comprises flowing water through a solid oxidizer to create a liquid cathode, contacting said liquid cathode to a metal anode, oxidizing said metal anode to release an oxidized metal, one or more electrons and one or more effluents, providing said one or more effluents to said cell and conditioning said cell via said one or more effluents.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
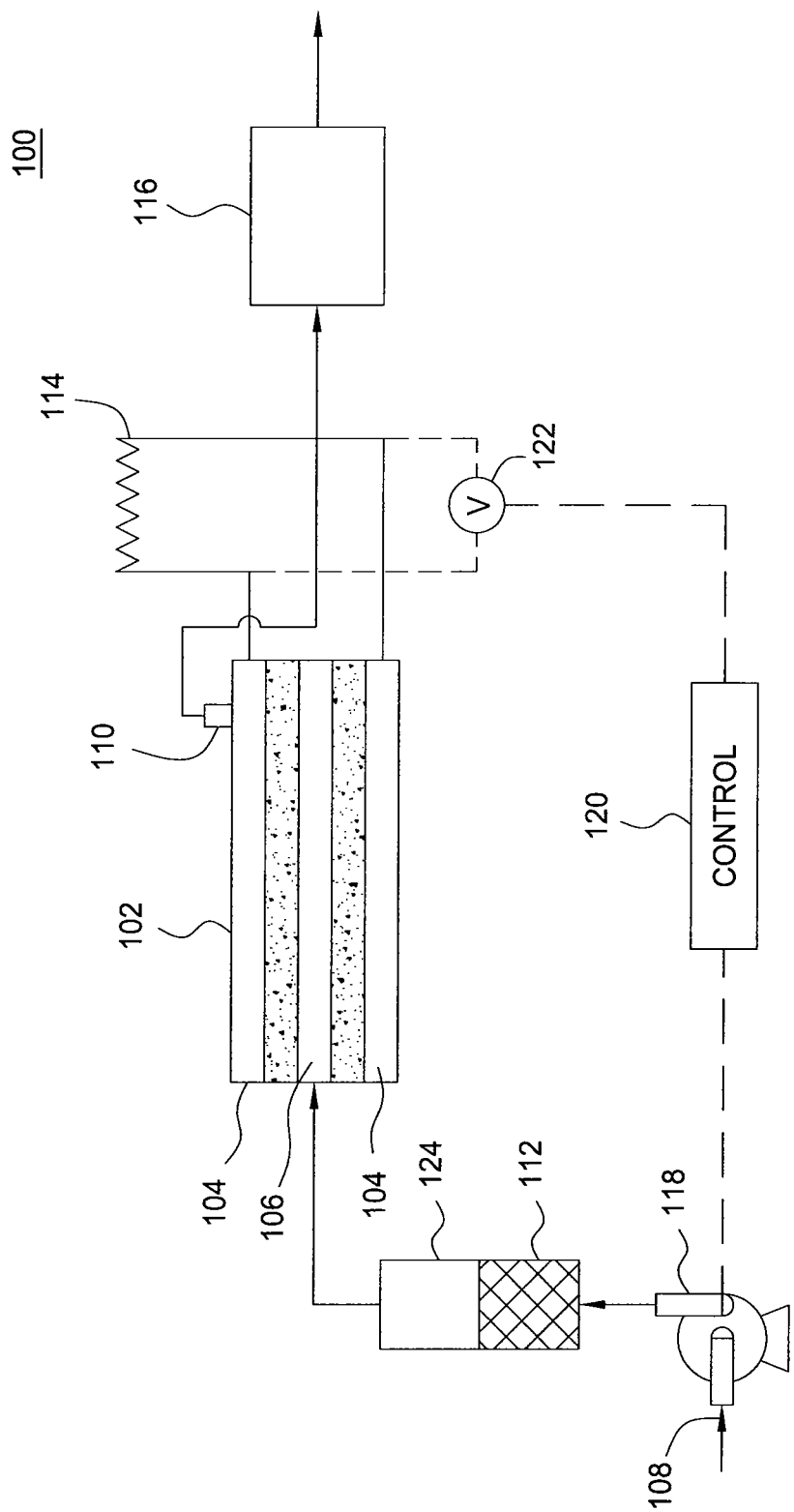
FIG. 1 depicts one embodiment of a flow through battery cell.

FIG. 1 illustrates one embodiment of a flow through battery cell 100. In one embodiment, the flow through battery cell 100 may be a water activated battery (WAB). That is, the flow through battery cell 100 does not generate energy until activated by a water source. However, unlike prior water activated batteries that simply contain the water or operate via a single addition of water, the present flow through battery cell 100 utilizes a continuous flow or intermittent flow of water and allows the water and additional aqueous solutions or effluents resulting from activation of the battery to flow through. As a result, the flow through battery cell 100 of the present invention provides a higher energy density than current battery technologies, and in one embodiment, provides further synergistic results when using the effluents that are allowed to pass through the battery that may otherwise be viewed as harmful to the environment. For example, the effluents when used in combination with other cells or additional flow through battery cells 100 may have advantageous results, as will be described below.

In one embodiment, the flow through battery cell comprises a galvanic cell 102 and a solid oxidizer 112. Although, the solid oxidizer 112 is illustrated as being separated from the galvanic cell 102, those skilled in the art will recognize that the solid oxidizer may be contained within the galvanic cell 102. In one embodiment, the galvanic cell 102 may have a cylindrical shape. In another embodiment, the galvanic cell 102 and the solid oxidizer 112 may be contained in a flat planar, e.g. a flat square or rectangle, battery configuration and shape. It should be noted that the current invention is not limited to a particular configuration or shape.

The solid oxidizer 112, when reacted with water, may create a catholyte or a liquid cathode for the flow through battery cell 100. For example, the solid oxidizer 112 is not activated until mixed with water. The solid oxidizer 112 may be configured to produce either a basic effluent or an acidic effluent. The flow through battery cell 100 may use fresh water or sea water (e.g. salt water). One skilled in the art will recognize that water may be referring to a solution with various suspended species as typically found in sea water.

In one embodiment, the water may be provided via a pump 118. Any type of pump may be used, for example an air operated pump, a centrifugal pump, a rotary pump, an impeller pump, a diaphragm pump and the like. Those skilled in the art may recognize that there may be any number of pumps 118 depending on the configuration of the flow through battery cell 100. For example, one or more storage tanks (not shown) may be placed anywhere along the path of the flow through battery cell 100. In such case, multiple pumps 118 may be used. Although FIG. 1 illustrates the pump 118 "pushing" the water through the flow through battery cell 100, those skilled in the art will recognize that the pump 118 may also be used to "pull" or "suck" water through the flow through battery cell 100.

In another embodiment, the pump 118 may not need to be used. For example, gravity may be used to force the water through the flow through battery cell 100. Alternatively, if the flow through battery cell 100 is used in under water applications, naturally occurring currents may be used to flow water through the flow through battery cell 100. The water may be optionally filtered (not shown) before being sent to the solid oxidizer 112. When mixed with water, the chemicals within the solid oxidizer 112 react with the water to form a catholyte that is subsequently used in the galvanic cell 102 to generate energy, as described below. Consequently, oxidizers are released within the catholyte that are used to oxidize an anode 106 within the galvanic cell 102, as will be discussed in further detail below. Those skilled in the art will recognize that the anode 106 may be in any shape or configuration within the galvanic cell 102. For example, the anode 106 may be a concentric solid cylinder within the galvanic cell 102, but is not so limited.

In one embodiment, the solid oxidizer 112 may be coupled to a turbulent mixer 124. The turbulent mixer 124 may be optional and not needed for some configurations of the solid oxidizer 112. For example, in one embodiment, if an organic halamine compound, succinimide compound or hypochlorite salt, discussed below, is used in the solid oxidizer 112, the turbulent mixer 124 may not be needed. Moreover, those skilled in the art will recognize that there may be any number of turbulent mixers 124. That is, the flow through battery cell 100 may comprise one or more turbulent mixers 124.

The turbulent mixer 124 may allow a weight ratio of water to a chemical used in the solid oxidizer 112 to be controlled. For example, if peroxides are used in the solid oxidizer 112, the relevant weight ratio would a weight ratio of water to peroxide particles. As a result, a matrix is not needed and the amount of surface area exposed need not be controlled. Rather, the solid oxidizer 112 may simply comprise desired chemical compounds, for example, peroxides, superoxides, carbonates, organic halamines, succinimides or hypochlorite salts.

In one embodiment, the weight ratio of peroxide particles (with radii between 0.5 and 2.0 mm) to water was found to be less than 95%. A weight ratio within this range allows the flow through battery cell 100 to have a temperature increment (when the cell is immersed in fluid at ambient temperature), that does not promote an uncontrolled decomposition of said solid peroxide. If the proper weight ratio is not maintained, the solid peroxide may decompose such that no catholyte is produced to react with the anode 106 of the galvanice cell 102. As a result, the proper weight ratio of peroxide particles to water provides a temperature increment that promotes controlled decomposition of the solid peroxide such that a catholyte is produced. Notably, the weight ratio may be irrelevant when using some compounds such as organic halamines, succinimides or hypochlorite salts in the solid oxidizer 112. That is, any weight ratio of water to organic halamine particles, succinimide particles or hypochlorite salt particles may be used.

As a result, the solid oxidizer 112 advantageously allows the flow through battery cell 100 to be stored indefinitely. In addition, the use of the solid oxidizer allows the overall weight of the flow through battery 100 to be reduced compared to other batteries. Also, the design of the flow through battery 100 allows the flow through battery 100 to be deployed in underwater applications without the use of a heavy or expensive pressure vessel as the flow of water itself can be used to maintain proper operating pressures within the flow through battery 100. That is, proper operating pressures may be maintained by regulating the flow of water through the flow through battery 100.

As noted above, the solid oxidizer 112 may be configured to produce either a basic effluent or an acidic effluent. In one embodiment, to produce a basic effluent from the solid oxidizer 112, peroxides, superoxides, carbonates or any combinations thereof, may be used. For example, compounds such as $Li_2O_2$, $Na_2O_2$, $KO_2$, $H_2O_2$, sodium percarbonate or copper peroxides may be used. For example, when a solid peroxide is used for the solid oxidizer 112 to produce a basic effluent, the reduction half reaction that occurs at the cathode may be as follows:

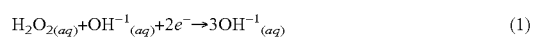
$$H_2O_{2(aq)} + OH^{-1}{}_{(aq)} + 2e^- \rightarrow 3OH^{-1}{}_{(aq)} \tag{1}$$

One skilled in the art will recognize that similar half reactions may occur at solid oxidizer 112 when various peroxides, superoxides or carbonates are used, such as for example lithium peroxide ($Li_2O_2$), sodium peroxide ($Na_2O_2$), $KO_2$, sodium percarbonate or copper peroxide.

In one embodiment, to produce an acidic affluent in the solid oxidizer 112, an organic halamine, a succinimide, a hypochlorite salt or any combinations thereof may be used. Halamines may be broadly defined as a compound in which an oxidative halogen is bonded to nitrogen. An organic halamine may be broadly defined as a halamine containing carbon atoms. For example, the organic halamine may be compounds such as $C_3N_3Cl_3O_3$, $C_3N_3(NHCl)_3$, $NaC_3N_3Cl_2O_3$ and $C_3(CH_3)N_2$ $BrClO_2$. Organic halamines were unexpectedly found to produce an acidic effluent. Example succinimides may be for example, $C_4H_4ClNO_2$, $C_4H_4BrNO_2$ or $C_4H_4INO_2$. Examples of hypochlorite salts may be fore example, $NaOCl$, $LiOCl$, $KOCl$ and $Ca(OCl)_2$.

In one embodiment, where sodium n-chlorosuccinimide ($C_4H_4ClNO_2$) is used for the solid oxidizer 112 to produce an acidic effluent, the reduction half reaction at the cathode may be as follows:

$$OCl^-_{(aq)} + H_2O_{(l)} + 2e^- \rightarrow 2OH^-_{(aq)} + Cl^-_{(aq)} \quad (2)$$

One skilled in the art will recognize that similar half reactions may occur at solid oxidizer 112 when various other organic halamines, succinimides or hypochlorite salts are used, such as for example $C_3N_3Cl_3O_3$, $C_3N_3(NHCl)_3$, $C_3(CH_3)N_2$ $BrClO_2$, $C_4H_4BrNO_2$, $C_4H_4INO_2$ and $NaOCl$, $LiOCl$, $KOCl$ and $Ca(OCl)_2$.

In one embodiment, the galvanic cell 102 may comprise an anode 106 and one or more current collectors 104. The anode may be a metal anode fabricated from any alkaline metal, alkaline earth metal, transitional metal or metal alloy. Transitional metals may be defined herein as any metal selected from Group 3 to Group 13 in the periodic table. For example, the anode 106 may be made from Lithium (Li), Magnesium (Mg) or Aluminum (Al) or less pure metal alloys such as aluminum alloys or magnesium alloys. In addition, the flow through battery cell 100 may comprise an inlet 108 and an outlet 110 for receiving a flow of water and for releasing one or more effluents, respectively. The inlet 108 may be at the pump 118 if a pump is used, at the solid oxidizer 112 or the galvanic cell 102 depending on how the flow through battery cell 100 is configured. In one embodiment, the outlet 110 may be located at the galvanic cell 102. Although, only a single inlet 118 and a single outlet 110 is illustrated in FIG. 1, those skilled in the art may recognize that any number of inlets 108 or outlets 110 may be used depending on how many flows are introduced into the flow through battery cell 100 or how many separate effluents are generated by the flow through battery cell 100.

As discussed above, when the solid oxidizer 112 is activated by water, the solid oxidizer may release oxidizers or oxidizing species into the resulting catholyte. The catholyte may subsequently be pumped into the galvanic cell 102 to contact the anode 106. As a result, the anode 106 may be oxidized and electrons may be released and captured by current collectors 104 and used by a powered system 114. In general, the oxidation half reaction at the anode may be as generally described as follows:

$$M \rightarrow M^{Z+}_{(aq)} + Ze^- \quad (3)$$

In Equation (3) above, M represents a metal losing Z electrons.

More specifically, in one example when a basic effluent is desired as described above in Equation (1) and aluminum is used for the anode 106, a desired electrochemical reaction may be as follows:

$$2Al_{(s)} + 3H_2O_{2(aq)} + 2OH^-_{(aq)} \rightarrow 2Al(OH)_4^-_{(aq)} \quad (4)$$

One skilled in the art will recognize that using any combination of another metal and/or another peroxide, superoxide or carbonate may follow a similar electrochemical reaction as described by Equation (4).

In another example, when an acidic effluent is desired as described above in Equation (2) and aluminum is used for the anode 106, a desired electrochemical reaction may be as follows:

$$4Al_{(s)} + 3NaC_3N_3Cl_2O_{3(s)} + 24H_2O(l) \rightarrow 4[Al(OH)(H_2O)_5]^{+2}_{(aq)} + 3Na^{+1}_{(aq)} + 6Cl^-_{(aq)} \quad (5)$$

One skilled in the art will recognize that using any combination of another metal and/or another organic halamine, succinimide or hypochlorite salt may follow a similar electrochemical reaction as described by Equation (5).

In one embodiment, the amount of energy produced by the flow through battery cell 100 may be controlled by a controller 120. As illustrated by FIG. 1, a voltmeter 122 may be coupled to the powered system 114 and the controller 120. The controller 120 may be coupled to the voltmeter 122 and the pump 118. Based on the voltage readings across the powered system 114 measured by the voltmeter 122, the controller 120 may control the pump 118 to provide the appropriate amount of water to the flow through battery cell 100. Thus, the flow of water may be continuous or may be intermittent and be controlled by the controller 120.

As discussed above, one embodiment of the flow through battery cell 102 allows effluents to be released out of the outlet 110. The effluents may be advantageously used to feed other cells to generate power or condition other cells, as will be discussed below. Alternatively, the effluent may be sent to a conditioning cell 116 to adjust a pH of the effluent.

Figure 6:
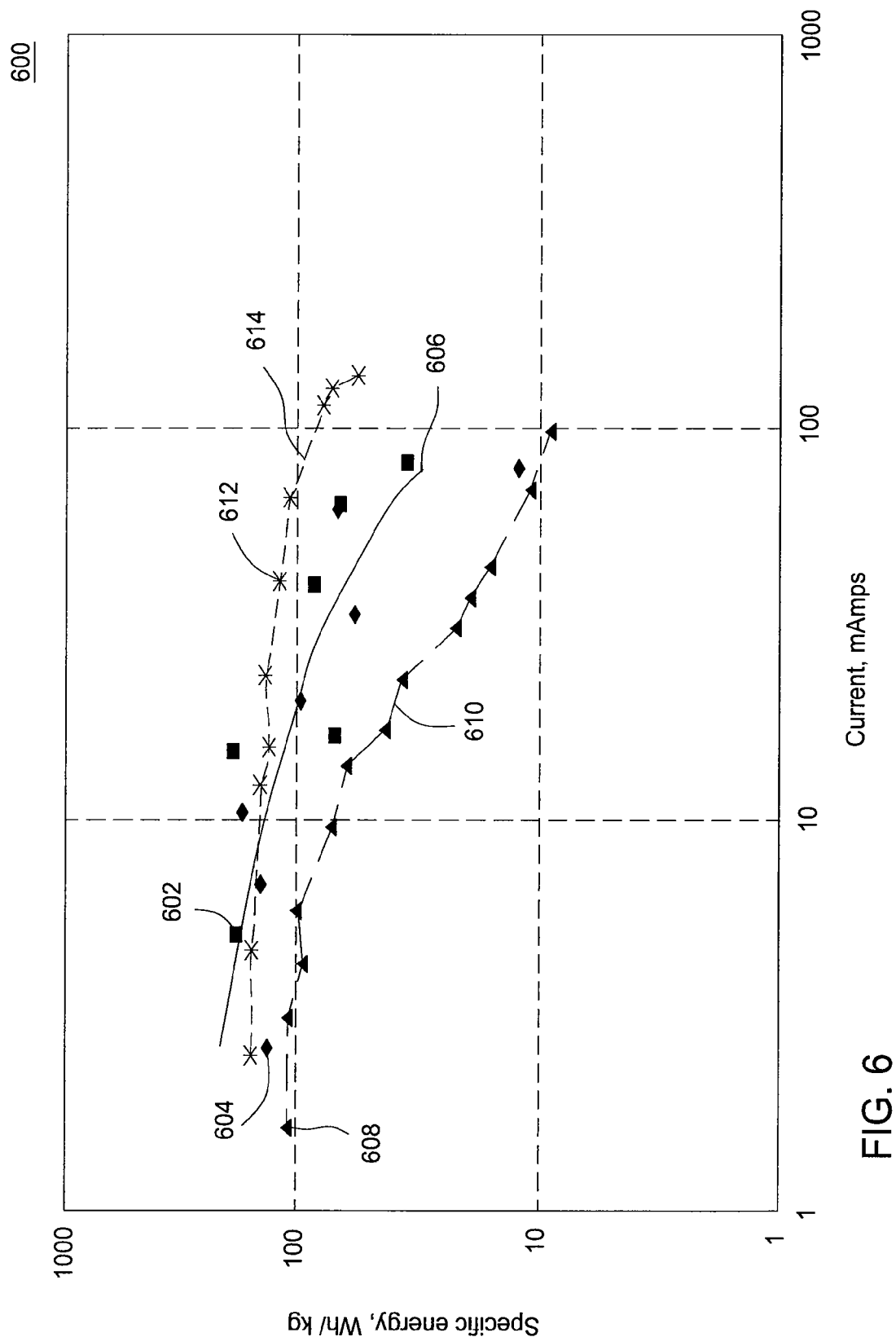
FIG. 6 depicts a comparison of energy densities between various types of batteries.

One advantage of the flow through battery cell 100 is that the flow through battery cell 100 also provides higher energy densities than standard batteries or single water addition water activated batteries. FIG. 6 illustrates a Ragone-type plot 600 of data collected in one illustrative working example of a flow through battery cell 100 versus a standard AAA-Zinc (Zn)-Manganese (Mn) dioxide battery and a single water addition water activated battery. The data of the Ragone-type plot 600 represents Specific Energy in Watt hours per kilogram (Wh/kg) versus Current in milliamps (mAmps).

In one embodiment represented by the data in FIG. 6, a flow through battery cell 100 having an aluminum anode was used. The solid oxidizer 112 was configured with trichloroisocyanuric acid ($C_3N_3Cl_3O_3$). Data was collected for two separate runs of providing an intermittent flow of water through the flow through battery cell 100. This data is represented by the squares 602 and the diamonds 604 in the Ragone-type plot 600. A least-squares regression was applied through the data points represented by solid line 606. FIG. 6 illustrates that a specific energy of approximately 200 Wh/kg was achieved by providing an intermittent flow of water through the flow through battery cell 100.

The specific energy for a single water addition water activated battery is represented by triangles 608 and the dashed lined 610. The specific energy for a standard AAA sized Zn—Mn dioxide battery is represented by asterisks 612 and dotted line 614. As illustrated by FIG. 6, it is noted that an initial energy density of the flow through battery cell 100 is the highest compared to other battery technologies. Thus, the flow through configuration of the flow through battery cell 100 can provide higher energy density. Moreover, the effluents outputted by the flow through battery cell 100 can provide unexpected results when used in combination with other cells, as discussed below.

Figure 2:
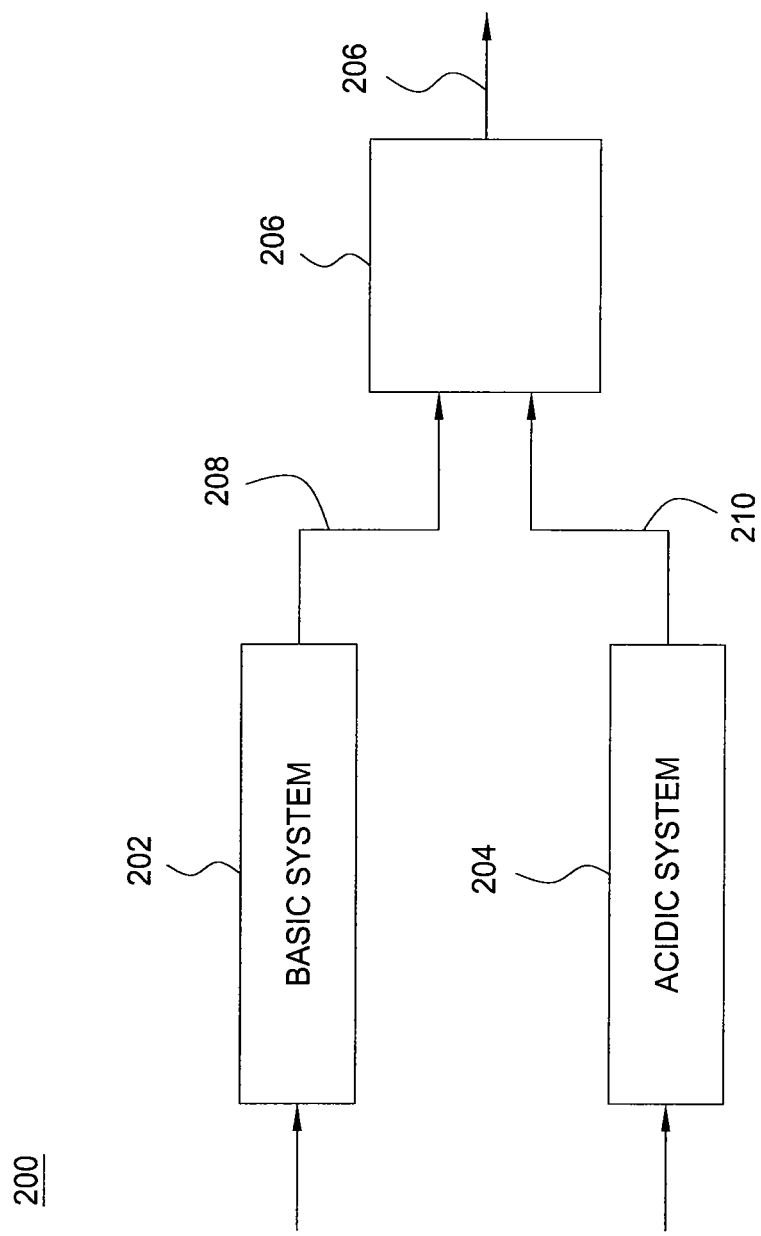
FIG. 2 depicts one embodiment of a system using a basic flow through battery cell and an acidic flow through battery cell.

FIG. 2 illustrates one embodiment where the effluents from a flow through battery cell may be used to provide synergistic results. FIG. 2 illustrates a high level block diagram of a system 200 comprising a first flow through battery cell having a basic system 202 and a second flow through battery cell having an acidic system 204. The chemistries for both the basic system 202 and the acidic system 204 are described above.

Used alone, the effluents from either the basic system 202 or the acidic system 204 would need to be conditioned. For example, as illustrated in FIG. 1, the effluents may be sent to a conditioning cell 116 to adjust a pH of the effluents. To adjust the pH of the effluents using the conditioning cell 116, additional chemicals may be required without receiving any benefit from the use of the additional chemicals.

In contrast, FIG. 2 illustrates one embodiment, where two flow through battery cells may be used to create an environmentally safe or innocuous effluent, while receiving the benefit of energy production from both flow through battery cells. The basic system 202 and the acidic system 204 may each be flow through battery cells 100 as described above with respect to FIG. 1. The only difference between the two systems may be that one produces a basic effluent 208 and one produces an acidic effluent 210.

In one embodiment, the basic effluent 208 from the basic system 202 may be combined with the acidic effluent 210 from the acidic system 204. For example, the basic effluent 208 and the acidic effluent 210 may be combined in an effluent conditioning cell 206. As a result, an innocuous effluent 212 may be released or stored that is environmentally friendly. That is, the innocuous effluent 212 may have no harmful effects to the environment. Innocuous may be defined as having a value close to 7 on a pH scale or environmentally friendly. That is, the innocuous effluent 212 may have no harmful effects on surrounding species, animals, flora, and the like. In one embodiment, the innocuous effluent 212 may comprise water, salt and a metal oxide. Moreover, the water may be recycled to activate the solid oxidizer of the flow through battery cells. In one embodiment, the basic effluent 208 may comprise unreacted hydroxide ions from Equation (1). In one embodiment, the acidic effluent 210 may comprise unreacted hypochlorous acid formed from the hypochlorous ions ($OCl^-$) from Equation (2).

Figure 3:
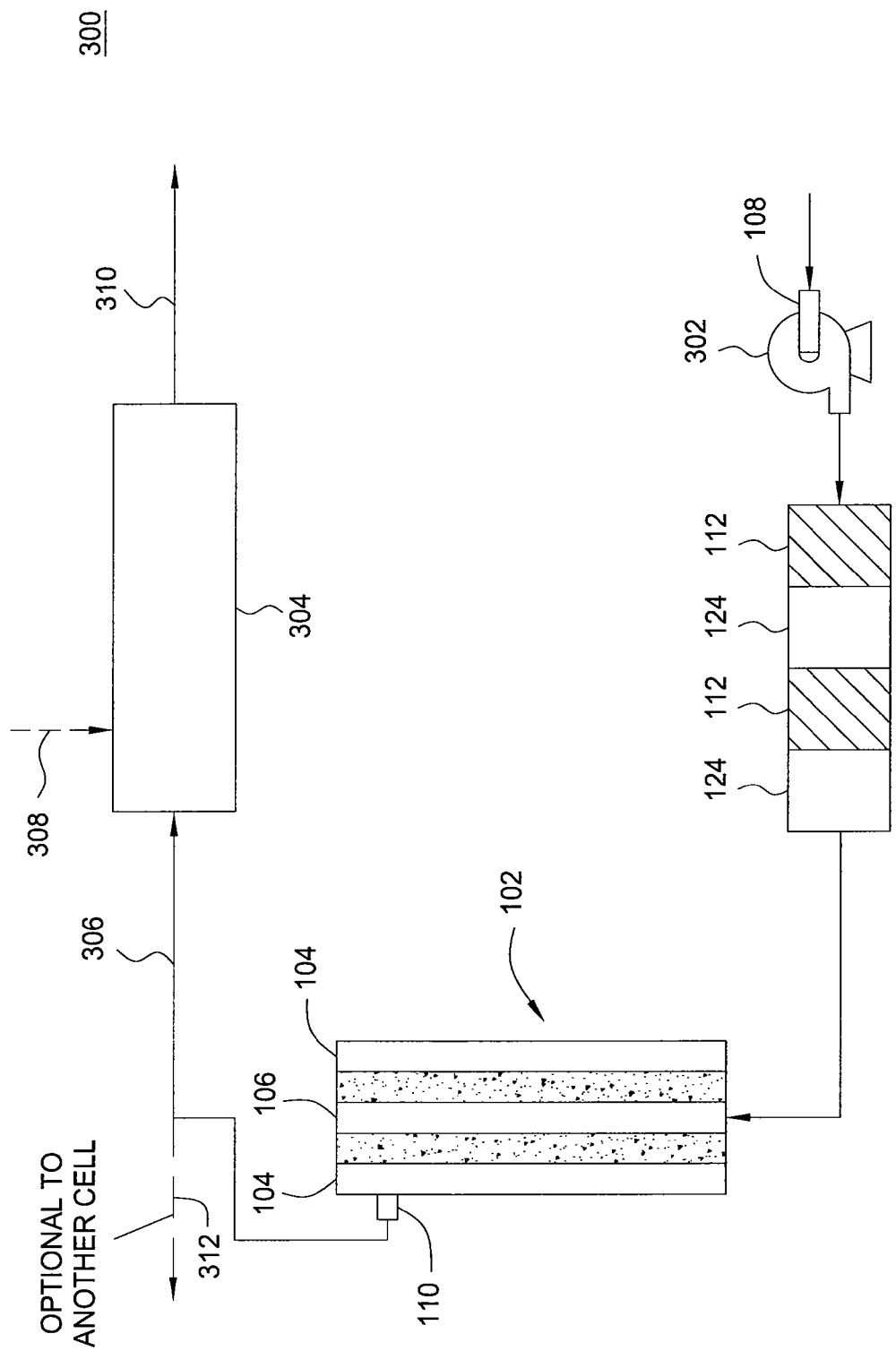
FIG. 3 depicts one embodiment of a flow through battery cell used with a module.

In another embodiment illustrated in FIG. 3, the flow through battery cell may be used in combination with another module 304. The flow through battery cell may be similar to the flow through battery cell 100 described in FIG. 1. For example, the flow through battery cell 100 may include a solid oxidizer 112, one or more turbulent mixers 124 and a galvanic cell 102. Notably, the solid oxidizer 112 may be separate from the galvanic cell 102 or contained within the galvanic cell as a single unit, as described above. The galvanic cell 102 may comprise an anode 106 and one or more current collectors 104. The flow through battery cell 100 may have an inlet 108 for taking in water and an outlet 110 for exiting effluent from the flow through battery cell 100. As discussed above, the inlet may be at the pump, the solid oxidizer or the galvanic cell depending on the configuration of the flow through battery system 100.

In the embodiment illustrated by FIG. 3, a pump 302 may be used to pump water into the flow through battery cell 100 or the pump 302 may placed further upstream pass the galvanic cell 102 to suck water through the flow through battery cell 100, as described above. Any type of pump may be used, for example an air operated pump, a centrifugal pump, a rotary pump, an impeller pump, a diaphragm pump and the like. Alternatively, as noted above, in some applications, no pump may be needed. As described above with reference to FIG. 1, the water may react with the solid oxidizer 112 to create a catholyte having oxidizing species or oxidizers to react with the anode 106 of the galvanic cell 102. Moreover, as the catholyte flows through the galvanic cell 102, one or more effluents 306 may be released via the outlet 110.

The one or more effluents 306 may be utilized by the module 304. For example, the module 304 may be another flow through battery cell 100, a fuel cell, a semi-fuel cell, a turbine or an internal combustion engine.

In one embodiment, where the module 304 is a fuel cell or a semi-fuel cell, the module 304 may take in hydrogen released as one of the effluents 306 from the flow through battery cell 100. In the embodiment where the module 304 is a fuel cell or a semi-fuel cell, oxygen may be fed to the module 304 as shown by dashed line 308. As is well known in the art, the hydrogen may serve as the anode in the fuel cell module embodiment and the oxygen may serve as the cathode. The reaction between the hydrogen and oxygen may produce energy from the fuel cell module embodiment and innocuous effluents 310 may be released by the module 304. For example, the innocuous effluents 310 may simply be water in the embodiment where the module 304 is a fuel cell or a semi-fuel cell. In one embodiment, the water may be recycled in the system to activate the solid oxidizer 112.

Figure 4:
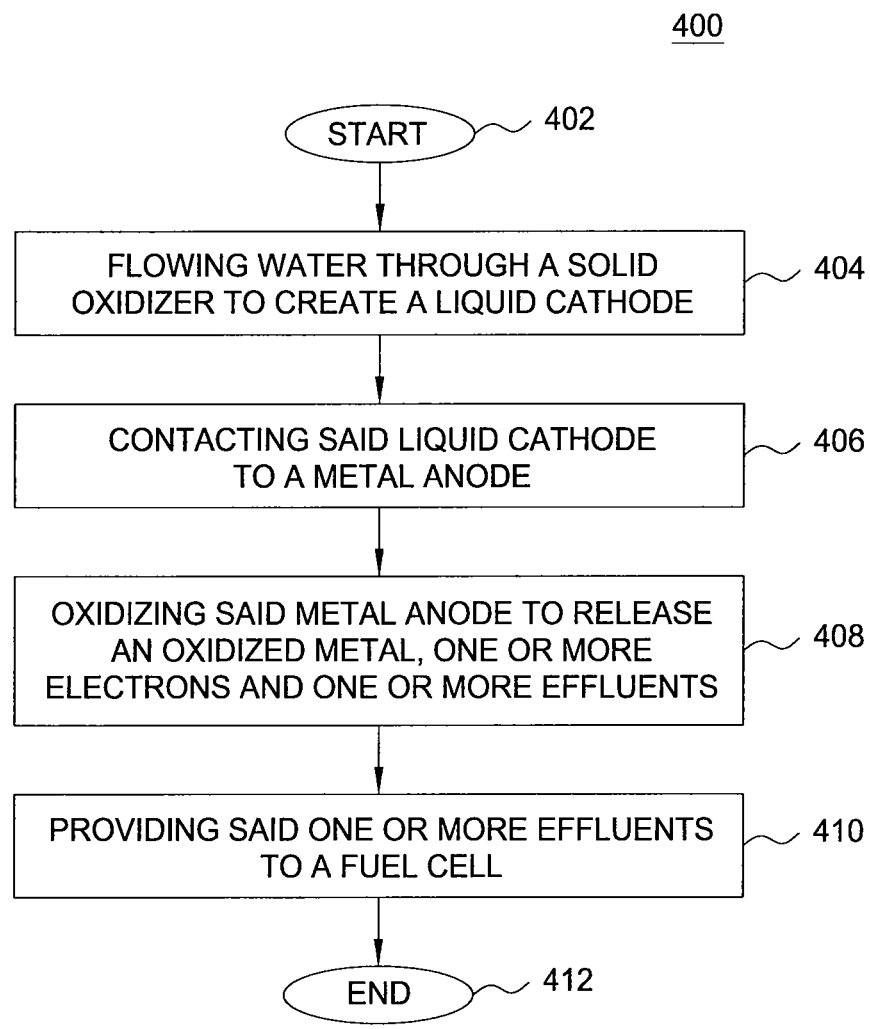
FIG. 4 depicts a flow diagram of one embodiment of a method for feeding a fuel cell.

FIG. 4 illustrates a flow diagram of one embodiment of a method 400 for feeding a fuel cell or semi-fuel cell as described above. Fuel cell and semi-fuel cell may be used interchangeably hereinafter. In one embodiment, the method may be carried out as illustrated in FIG. 3 by a combination of a flow through battery cell 100 and a fuel cell, for example module 304. The method 400 begins at step 402.

At step 404, the method 400 flows water through a solid oxidizer to create a liquid cathode. For example, the liquid cathode may be the catholyte described resulting in the reaction between the chemical species in the solid oxidizer 112 and water.

Then the method 400 proceeds to step 406 where the liquid cathode is contacted to a metal anode.

At step 408, the method 400 oxidizes the metal anode to release an oxidized metal, one or more electrons and one or more effluents. As described above, the liquid cathode may be used to oxidize the metal anode of a galvanic cell 102 to release electrons and produce energy. Moreover, the one or more effluents will depend on whether the solid oxidizer 112 used has a basic chemistry or an acidic chemistry.

At step 410, the method 400 provides the one or more effluents to the fuel cell. For example, one of the effluents 310 in FIG. 3 may be hydrogen. The hydrogen may be used with a feed of oxygen to the module 304 to feed a fuel cell. In other words, the hydrogen from the effluents 310 may be reacted with the oxygen in the fuel cell to create energy. As a result, effluents that were previously not utilized and considered hazardous to the environment may provide synergistic results by applying them to another cell. The method 400 concludes at step 412.

In another embodiment, the module 304 may be a second flow through battery cell 100. For example, the effluents 306 from the first flow through battery cell 100 may contain one or more ions or gases. For example, the ions may be halogen ions (e.g., $Cl^-$ or $Br^-$) and the gases may be halogen gases (e.g., $Cl_2$ or $Br_2$), oxygen and or hydrogen. The examples provided above should not be considered limiting and those skilled in the art will recognize that other ions or gases may also be present. These chemicals may also be used as an oxidant for driving the oxidation of a metal anode in another flow through battery cell 100. As a result, a single solid oxidizer 112 may be used to power multiple flow through battery cells 100 by utilizing the effluents 306 of the first flow through battery cell.

Moreover, the concept of method 400 illustrated in FIG. 4 may be combined with the concept described above where module 304 may also be another flow through battery cell 100. For example, the one or more effluents 306 may be separated. Thus, in one embodiment, hydrogen may be separated out of the one or more effluents 306 and fed to a module 304 that represents a fuel cell to power the fuel cell as described above. In addition, the ions or gases may be separated and fed to a second flow through battery cell 100 or re-fed to the solid oxidizer 112 as illustrated by dashed line 312 in FIG. 3. For example, the effluent 312 when re-fed to the solid oxidizer 112 may affect the decomposition rate of the solid oxidizer 112.

In yet another embodiment of the present invention, the effluents 306 may be used to condition another flow through battery cell 100. For example, module 304 may be a second flow through battery cell similar to the flow through battery 100 described above with respect to FIG. 1. If the second flow through battery cell represented by module 304 produces a basic effluent, the anode may collect scaling. For example, where aluminum is used as the anode as described above with respect to FIG. 1, a competing reaction to Equation (4) may be as follows:

$$2Al_{(s)} + 3H_2O_{2(aq)} \rightarrow 2Al(OH)_{3(s)} \tag{6}$$

The solid aluminum hydroxide produced in Equation (6) may collect at the anode of the second flow through battery represented by module 304. The scaling formed by the solid aluminum hydroxide may cause the second flow through battery 100 represented by module 304 to slowly lose efficiency and eventually fail. To resolve this issue, in one embodiment, the first flow through battery 100 may have a solid oxidizer 112 that produces an acidic effluent 306. The acidic effluent 306 may be used to "condition" the second flow through battery 100 represented by module 304. That is, the acidic effluent 306 may be used to flush the second flow through battery represented by module 304 and wash away any solid aluminum hydroxide collecting on the anode of the second flow through battery represented by module 304. In other words, the acidic effluent 306 may be used to adjust the pH level of the second flow through battery represented by module 304 to prevent scaling on the anode of the second flow through battery 100 represented by module 304.

Figure 5:
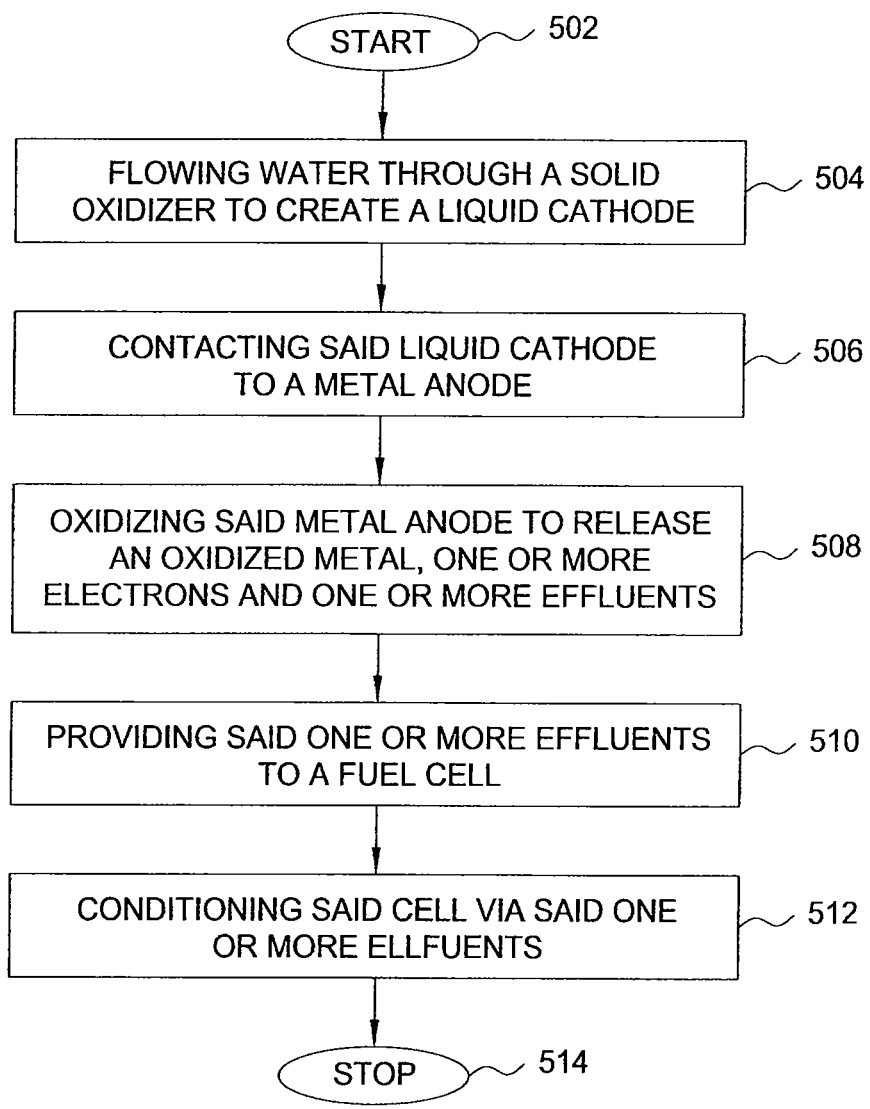
FIG. 5 depicts a flow diagram of one embodiment of a method for conditioning a cell.

FIG. 5 illustrates a flow diagram of one embodiment of a method 500 for conditioning a module as described above. In one embodiment, the method may be carried out as illustrated in FIG. 3 by a combination of a flow through battery cell 100 and a second flow through battery cell represented by module 304. For example, the first flow through battery cell 100 may configure the solid oxidizer 112 to produce an acidic effluent 306 and the second flow through battery cell represented by module 304 may configure a respective solid oxidizer (not shown) to produce a basic effluent. The method 500 begins at step 502.

At step 504, the method 500 flows water through a solid oxidizer to create a liquid cathode. For example, the liquid cathode may be the catholyte described resulting in the reaction between the chemical species in the solid oxidizer 112 and water.

Then the method 500 proceeds to step 506 where the liquid cathode is contacted to a metal anode.

At step 508, the method 500 oxidizes the metal anode to release an oxidized metal, one or more electrons and one or more effluents. As described above, the liquid cathode may be used to oxidize the metal anode of a galvanic cell 102 to release electrons and produce energy. Moreover, the one or more effluents will depend on whether the solid oxidizer 112 is configured to produce a basic effluent or an acidic effluent.

At step 510, the method 500 provides the one or more effluents to the cell. For example, as described above, the one or more effluents may be an acidic effluent from the first flow through battery 100.

At step 512, the method 500 conditions the cell via the one or more effluents. As described above, in one embodiment, the acidic effluent from the first through battery 100 may be used by the second flow through battery represented by module 304 to condition the second flow through battery. Flushing the acidic effluent from the first flow through battery 100 through the second flow through battery represented by module 304 may help remove scaling that accumulates on an anode (not shown) of the second flow through battery. For example, if the second flow through battery represented by module 304 produces a basic effluent, aluminum hydroxide may build on the anode. The acidic effluent from the first flow through battery 100 may be used to remove the aluminum hydroxide by adjusting a pH level of the electrolytes within the second flow through battery represented by module 304. The method 500 concludes at step 514.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
    a basic galvanic battery cell for receiving a first flow of sea water and generating a basic effluent, wherein said basic galvanic battery cell comprises:
       a first inlet for receiving said first flow of sea water;
       a first solid oxidizer coupled to said first inlet for reacting with said first flow of sea water to generate a first catholyte;
       a first galvanic module coupled to said first solid oxidizer for receiving said first catholyte and generating said basic effluent; and
       a first outlet for releasing said basic effluent;
    an acidic galvanic battery cell for receiving a second flow of sea water and generating an acidic effluent, wherein said acidic galvanic battery cell comprises:
       a second inlet for receiving said second flow of sea water;
       a second solid oxidizer coupled to said second inlet for reacting with said second flow of sea water to generate a second catholyte, wherein the second solid oxidizer comprises an organic halamine;
       a second galvanic module coupled to said second solid oxidizer for receiving said second catholyte and generating said acidic effluent; and
       a second outlet for releasing said acidic effluent; and
    an effluent conditioning cell coupled to said basic galvanic battery cell and said acidic galvanic battery cell for combining said basic effluent and said acidic effluent to create a neutral effluent.

2. The system of claim 1, further comprising at least one controller coupled to said basic galvanic battery cell, said acidic galvanic battery cell and a powered system, wherein said at least one controller is for metering said first flow of sea water and said second flow of sea water in response to a voltage measurement across said powered system.

3. The system of claim 1, wherein said first flow of sea water is continuous or intermittent.

4. The system of claim 1, wherein said second flow of sea water is continuous or intermittent.

5. The system of claim 1, wherein said first solid oxidizer comprises a peroxide, a superoxide or carbonate.

6. The system of claim 1, wherein said first solid oxidizer comprises at least one of: $Li_2O_2$, $Na_2O_2$, $KO_2$, $H_2O_2$, sodium percarbonate or copper peroxide.

7. The system of claim 1, wherein said first galvanic module comprises:
   a metal anode comprising at least one of: Li, Mg or Al; and
   a current collector.

8. The system of claim 1, wherein said second solid oxidizer comprises at least one of: $C_3N_3Cl_3O_3$, $C_3N_3(NHCl)_3$, $NaC_3N_3\,Cl_2O_3$ or $C_3(CH_3)N_2\,BrClO_2$.

9. The system of claim 1, wherein said second galvanic module comprises:
   a metal anode comprising at least one of: Li, Mg or Al; and
   a current collector.

10. The system of claim 1, wherein said neutral effluent comprises water, a salt and a metal oxide.

\* \* \* \* \*